US012764074B2

(12) United States Patent
Mangin

(10) Patent No.: US 12,764,074 B2
(45) Date of Patent: Oct. 13, 2026

(54) METHOD IMPLEMENTED IN PACKET-SWITCHED NETWORK FOR SCHEDULING THE TRANSMISSION OF ETHERNET FRAMES BASED ON PRIORITY LEVELS

(71) Applicant: MITSUBISHI ELECTRIC CORPORATION, Tokyo (JP)

(72) Inventor: Christophe Mangin, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 288 days.

(21) Appl. No.: 18/289,034

(22) PCT Filed: Dec. 10, 2021

(86) PCT No.: PCT/JP2021/046656
§ 371 (c)(1),
(2) Date: Oct. 31, 2023

(87) PCT Pub. No.: WO2022/254760
PCT Pub. Date: Dec. 8, 2022

(65) Prior Publication Data

US 2024/0236012 A1 Jul. 11, 2024

(30) Foreign Application Priority Data

May 31, 2021 (EP) .................................... 21305723

(51) Int. Cl.
*H04L 47/56* (2022.01)
*H04L 47/22* (2022.01)
(Continued)

(52) U.S. Cl.
CPC ............ *H04L 47/564* (2013.01); *H04L 47/22* (2013.01); *H04L 47/28* (2013.01); *H04L 47/621* (2013.01);
(Continued)

(58) Field of Classification Search
CPC ....... H04L 47/564; H04L 47/22; H04L 47/28; H04L 47/621; H04L 47/623;
(Continued)

(56) References Cited

U.S. PATENT DOCUMENTS

| | | | | |
|---|---|---|---|---|
| 10,270,567 | B1 * | 4/2019 | Rang | H04L 5/0044 |
| 10,425,321 | B2 * | 9/2019 | Joseph | H04L 43/50 |

(Continued)

FOREIGN PATENT DOCUMENTS

| | | | |
|---|---|---|---|
| CN | 105245301 | A | 1/2016 |
| EP | 3 057 273 | A1 | 8/2016 |

(Continued)

OTHER PUBLICATIONS

"60802-d1-2", IEEE Draft; 60802-D1-2, IEEE-SA, Piscataway, NJ USA, Jun. 17, 2020, vol. 802.1 60802 drafts, No. d1, pp. 1-58.
(Continued)

*Primary Examiner* — Mounir Moutaouakil
(74) *Attorney, Agent, or Firm* — Birch, Stewart, Kolasch & Birch, LLP

(57) ABSTRACT

The present invention relates to a method implemented in a packet-switched network for scheduling transmission of Ethernet frames, comprising the steps of:

a) determining a priority level of each Ethernet frame to transmit, based on identification of data given in said Ethernet frame and related to a stream to which said Ethernet frame belongs, b) determining, among the frames having the highest priority level, a frame, candidate for transmission, (Continued)

having a closest next time at which said candidate frame is to be transmitted, and c) estimating an end-of-transmission time of said candidate, and checking whether a frame having a higher priority than the candidate does not have a next transmission time occurring before the end-of-transmission time of the candidate, and eventually transmitting the candidate.

14 Claims, 10 Drawing Sheets

(51) Int. Cl.

| | |
|---|---|
| ***H04L 47/28*** | (2022.01) |
| ***H04L 47/62*** | (2022.01) |
| ***H04L 47/6275*** | (2022.01) |
| ***H04L 47/6295*** | (2022.01) |

(52) U.S. Cl.

CPC ........ *H04L 47/623* (2013.01); *H04L 47/6275* (2013.01); *H04L 47/6295* (2013.01)

(58) Field of Classification Search

CPC ............. H04L 47/6275; H04L 47/6295; H04L 47/2416; H04L 47/56; H04L 47/801; H04L 47/803; H04L 47/826

See application file for complete search history.

(56) References Cited

U.S. PATENT DOCUMENTS

| | | | | |
|---|---|---|---|---|
| 10,609,054 | B2 * | 3/2020 | Jackson | G06F 21/554 |
| 10,624,089 | B2 * | 4/2020 | Osagawa | H04W 72/0446 |
| 10,958,563 | B2 * | 3/2021 | Craciunas | H04L 47/24 |
| 11,108,675 | B2 * | 8/2021 | Datta | H04L 43/50 |
| 11,444,831 | B2 * | 9/2022 | Bhaduri | H04L 43/50 |
| 11,502,932 | B2 * | 11/2022 | Bergeron | H04L 43/12 |
| 11,563,768 | B2 * | 1/2023 | Regev | H04L 63/1416 |
| 11,677,515 | B2 * | 6/2023 | Murayama | H04L 1/1642 370/329 |
| 11,758,024 | B2 * | 9/2023 | Beckhoff | H04L 49/3072 370/392 |
| 11,968,111 | B2 * | 4/2024 | Wang | H04L 47/56 |
| 12,063,287 | B1 * | 8/2024 | Regev | H04L 47/28 |
| 12,170,566 | B2 * | 12/2024 | Rang | H04B 7/18506 |
| 12,199,877 | B2 * | 1/2025 | Bush | H04L 41/0896 |
| 2017/0331748 | A1 * | 11/2017 | Mangin | H04L 47/826 |
| 2019/0007344 | A1 * | 1/2019 | Mangin | H04L 47/6275 |
| 2019/0199641 | A1 | 6/2019 | Lo Bello et al. | |
| 2022/0210078 | A1 * | 6/2022 | Mangin | H04L 47/225 |
| 2024/0236012 | A1 * | 7/2024 | Mangin | H04L 47/564 |

FOREIGN PATENT DOCUMENTS

| | | | |
|---|---|---|---|
| JP | 2017-532870 | A | 11/2017 |
| WO | WO 2020/155185 | A1 | 8/2020 |
| WO | WO 2021/059683 | A1 | 4/2021 |

OTHER PUBLICATIONS

International Search Report, issued in PCT/JP2021/046656, dated Mar. 10, 2022.

Written Opinion of the International Searching Authority, issued in PCT/JP2021/046656, dated Mar. 10, 2022.

Chuang et al., "Online Stream-Aware Routing for TSN-Based Industrial Control Systems," IEEE, XP033835633, 2020, pp. 254-261.

European Communication pursuant to Article 94(3) EPC for European Application No. 21 305 723.5, dated Sep. 6, 2024.

Japanese Office Action for Japanese Application No. 2023-574888, dated Aug. 20, 2024, with English translation.

Korean Office Action for Korean Application No. 10-2023-7039698, dated Jan. 22, 2026, with English translation.

* cited by examiner

| Characteristics | |
|---|---|
| Cyclic | Yes |
| Data delivery requirement | Deadline or latency |
| Time-triggered transmission | Yes |

| Characteristics | |
|---|---|
| Cyclic | Yes |
| Data delivery requirement | Latency |
| Time-triggered transmission | Optional |

| Characteristics | |
|---|---|
| Cyclic | No |
| Data delivery requirement | Latency |
| Time-triggered transmission | No |

| Characteristics | |
|---|---|
| Cyclic | No |
| Data delivery requirement | N/A |
| Time-triggered transmission | No |

FIG. 1

METHOD IMPLEMENTED IN PACKET-SWITCHED NETWORK FOR SCHEDULING THE TRANSMISSION OF ETHERNET FRAMES BASED ON PRIORITY LEVELS

TECHNICAL FIELD

The present invention relates to the management of networks such as Industrial Automation (IA) networks.

BACKGROUND ART

The joint IEC/IEEE 60802 standard specifies a TSN (Time Sensitive Networks) profile for Industrial Automation (IA) networks by defining features selected from a set of IEEE 802.1 and 802.3 standards.

This selection is justified by the necessity to support the different types of traffics encountered in an IA network. These traffic types and their basic features are described in the following sub-sections.

The following describes some IEC/IEEE 60802 traffic type categories.

To ease the mapping of application-related traffic types onto TSN streams, four traffic type categories are first defined that characterize the communications found in Industrial Automation (IA) networks.

FIG. 1 shows from top to bottom features of:

the IA time-aware stream;

the IA stream;

IA traffic-engineered non-stream;

IA non-stream.

Hereafter are presented IEC/IEEE 60802 traffic type descriptions.

A first type is related to isochronous traffic. This is a type of IA time-aware stream traffic that is transmitted cyclically using time-triggered transmission. Listeners have individual deadline requirements. Cycle times are typically in the range of microseconds to tens of milliseconds. Frame size is typically below 500 octets. Talker-listener pairs are synchronized to the working clock. The network is engineered to provide zero congestion loss for this traffic type. This type of traffic is normally used in control loop tasks.

A second type of traffic is cyclic-synchronous and relates to IA time-aware stream traffic that is transmitted cyclically using time-triggered transmission. Talker-Listeners pair have individual latency requirements. Cycle times are typically in the range of hundreds of microseconds to hundreds of milliseconds. Frame size is not constrained. Talker-listener pairs are synchronized to the working clock. The network is engineered to provide zero congestion loss for this traffic type.

A third type of traffic is cyclic-asynchronous and relates to a type of IA stream traffic that is transmitted cyclically and bounded by the application clock. Talker-Listeners pair have individual latency requirements. Cycle times are typically in the range of milliseconds to seconds. Frame size is not constrained. Data exchanges between Talker-listener pairs are typically not dependent on the working clock. This traffic type typically tolerates congestion loss. The network is engineered to handle this traffic type without loss, up to a certain number of frames or data size.

A fourth type of traffic is for managing alarms and events and is a type of IA traffic engineered non-stream that is transmitted a-cyclically. This traffic expects bounded latency including time for retransmission in the range of milliseconds to hundreds of milliseconds. The source of the alarm or event typically limits the bandwidth allocated to this traffic. Frame size is not constrained. Retransmission to mitigate frame loss is expected. The network is engineered to handle these frames, including bursts of frames, up to a certain number of frames or data size over a defined period.

A fifth type of traffic is related to configuration and diagnostics and corresponds to a type of IA traffic engineered non-stream that is transmitted a-cyclically. This traffic expects bounded latency, up to seconds, including time for retransmission. The source of configuration or diagnostics frames typically limits the bandwidth allocated to this traffic. Frame size is not constrained. Retransmission to mitigate frame loss is expected. The network is engineered to handle these frames, including bursts of frames, up to a certain number of frames or data size over a defined period.

A sixth type is related to network control and is an IA traffic engineered non-stream that can be transmitted cyclically or a-cyclically. This traffic expects bounded latency including time for retransmission. Frame size is not constrained. The network is engineered to handle these frames, including bursts of frames, up to a certain number of frames or data size over a defined period. This type contains network control frames. Examples include time synchronization, loop prevention, and topology detection.

Finally, a seventh type of traffic is scheduled for a "best effort" and is a type of IA non-stream. The network is engineered to ensure that these frames do not interfere with other traffic types.

The standard IEC/IEEE 60802 proposes the following mapping between the traffic types, traffic type categories and the priorities available in an Ethernet network:

| Traffic type | Traffic type category | Traffic class. |
|---|---|---|
| Isochronous | IA time-aware-stream | 7 |
| Cyclic-Synchronous | IA time-aware-stream | 6 |
| Cyclic-Asynchronous | IA stream | 5 |
| Network Control | IA traffic engineered non-stream | 4 |
| Alarms and Events | IA traffic engineered non-stream | 3 |
| Configuration & Diagnostics | IA traffic engineered non-stream | 2 |
| Best Effort | IA non-stream | 1 |
| Best Effort | IA non-stream | 0 |

The network mechanisms for IA networks selected in IEC/IEEE 60802 are mainly those defined in the various TSN standards specified by IEEE 802.1. As far as quality of service is concerned, these mechanisms are almost exclusively defined for bridges and not for end-stations.

However, end-stations, through their network access, have to generate traffics that conform with the mechanisms provided within the network and sometimes extend those.

In particular, the typical per-traffic class queuing model used in the IEEE 802.1Q standard is not sufficient to fully describe the behavior associated with the different timing requirements of the TSN streams supporting the different traffic types described above. Per-stream queues and per-frame time transmission control have to be introduced.

The combination of these standard and additional mechanisms provide a way to support disciplined network access to all traffic classes.

To overcome this situation, the OPC UA FLC has proposed an end-station model that incorporates per-stream queues and time-aware offset control ("OPC" for "Open Platform Communication", "UA" for "Unified Architecture" and "FLC" for "Field Level Communication").

These additional functionalities allow the decoupling of the middleware and the applications from the Ethernet interface while supporting different Quality of Service (QOS) requirements. FIG. 2 summarizes this model.

In practice, an end station may be the source of multiple TSN streams, with the data for the different streams being produced by the applications or the middleware running in the end station. In this model, the different streams are mapped to different per-stream queues shown in FIG. 2.

As long as data frames are enqueued into their respective per-stream queues before the transmission times, the time-aware offset control is able to release the data frames into the per-traffic class queues, which can then be handled per the standardized IEEE 802.1Q mechanisms, some of which are presented hereafter.

Frames from the per-stream queues and frames from non-time-aware traffic are queued at the egress port of an end station (IEEE 802.1Q-2018 Clause 8.6.8). An egress port of the end station has eight queues to manage the traffic flow. Each of the per-stream queues and the non-TSN stream queues are mapped to one of the eight per-traffic class queues. The use of the per-traffic class queues is in turn based on the priority code point (PCP) field in the VLAN-Tag (traffic class-priority mapping). The PCP value is associated with the traffic class of the stream or the non-time-aware traffic/frames. The mapping between the PCP field and the queue is handled by the network management functions.

A transmission selection algorithm stage applies, for each traffic class, the per-traffic class transmission selection algorithm to select the frames to be transmitted from the corresponding queue. The strict priority transmission selection algorithm defined in Section 8.6.8.1 of IEEE 802.1Q-2018 is used.

Non-time-aware data frames are also mapped to different per-traffic class queues. Depending on the type and level of QOS needed, data frames of TSN streams may use per-traffic class queues different from non-time-aware traffics.

Moreover, a gate control list describes the transmission gate operation of the per-traffic class queues. Each of the eight per-traffic class queues is scheduled relative to a known timescale such that the timing and the rate at which data frames are transmitted can be controlled as per IEEE 802.1Q-2018 Clause 8.6.8.4 (ex-802.1Qbv). In the model shown in FIG. 2, a single transmission gate is used per per-traffic class queue. As 802.1Q allows up to eight traffic classes and up to eight transmission gates may be present and have to be controlled by gate control lists.

Transmission selection can be used to select and deliver the available frames, based on the transmission selection algorithm and gate control lists, to either the preemptible MAC or the express MAC. Available data frames are selected according to the rank of their traffic class. This process is described in IEEE 802.1Q-2018 Clause 8.6.8. Transmission selection in a TSN Talker operates in the same way as in a bridge (from this point of view, a TSN Talker can be thought of as if it were a single-port bridge).

MAC control ("MAC" for "Media Access Control"), along with preemptible MAC (pMAC), express MAC (eMAC), and MAC Merge sublayer are used to support the frame preemption capability in the egress port of the end station. The MAC Merge sublayer supports interspersing express traffic with preemptible traffic by using a MAC Merge sublayer to attach an eMAC and a pMAC to a single Reconciliation Sublayer (RS) service (IEEE 802.1Q-2018 Clause 6.7.1 and IEEE 802.3 Clause 99.4).

If frame preemption is supported, each PCP value is assigned a preemption status indicating whether the value of preemptability is "express" or "preemptible" (ref IEEE 802.1Q-2018 Clause 6.7.2).

Frames with PCP values corresponding to express are able to preempt on-going transmission of preemptible frames, allowing the express frames to avoid latencies related to awaiting the completion of the transmission of preemptible frames.

The model of the egress port operation in end-stations capable of supporting the various traffic types defined in IEC/IEEE 60802 rely on the stacking of various mechanisms specified in IEEE 802.1Q and OPC UA FLC standards.

However, this scheduling architecture, although modular in a first approach, may end up in added complexity and leading to an inefficient implementation, hardware in particular.

SUMMARY OF INVENTION

The present invention aims to improve the situation.

To that end, it proposes a method implemented in a packet-switched network for scheduling transmission of Ethernet frames, the method comprising:

a) determining a priority level of each Ethernet frame to transmit, based on identification of data given in said Ethernet frame and related to a stream to which said Ethernet frame belongs, said data distinguishing thereby:
   - frames belonging to streams to be transmitted by successive cyclic bursts, and having a first priority level,
   - frames belonging to rate controlled streams, and having a second priority level, and
   - frames belonging to non-time critical traffic streams, having a third priority level, lower than said first and second priority levels, b) determining, among the frames having the highest priority level, a frame, candidate for transmission, having a closest next time at which said candidate frame is to be transmitted, and c) estimating an end-of-transmission time of said candidate, and checking whether a frame having a higher priority than the candidate does not have a next transmission time occurring before the end-of-transmission time of the candidate, and eventually transmitting the candidate.

Therefore, the present invention enables a fair scheduling of frames of different types, e.g. the frames belonging to streams to be transmitted by cyclic bursts as shown in dark grey and light grey in FIG. 7 commented below ("CB Stream bursts"), while other types of frames (RC for "Rate Controlled" frames, and "best effort" frames (EF)) can be transmitted when no cyclic burst is being transmitted. Such an implementation is performed thanks to the assignation of priority levels to each type of stream.

In an embodiment, after b), if the aforesaid closest next transmission time (which is referenced "MinNextTxTime$_p$" in FIG. 11 commented below) is higher (at step S4) than a current time (T) given by a common clock of the packet-switched network, b) is repeated with a priority level resulting from a decrement of said highest priority level (p=p−1) and as long as the closest next transmission time determined in b) is higher than said current time (T).

Therefore, as long as the transmission time of a candidate frame has not expired, it is sought to transmit frames (or fragment of frames when the non-time critical traffic is preemptible) of lower priority levels and typically of the third priority level (the lowest one).

Indeed, frames belonging to non-time critical traffic streams (e.g. best effort "EF" streams) can be fragmented so as to transmit only a fragment of such a frame if the transmission time of a candidate frame having a higher priority level will expire soon. It is usually possible to fragment that kind of frame until a minimum sized fragment, and thereby to determine:

a duration of transmission of that kind of frame (or frame fragment), and then its end-of-transmission time so as to implement step c) as defined above.

This reasoning can be applied possibly also to rate controlled streams when they are preemptible.

Therefore, in an embodiment as shown in FIG. 11 (test S3), frames belonging to non-time-critical traffic streams, and having thus the lowest (third) priority level, are identified as belonging to a preemptable traffic and transmittable whenever no frames of first and second priority levels are to be transmitted. Therefore, before testing whether said closest next transmission time ($MinNextTxTime_p$) is higher (S4) than said current time (T), it is determined whether said candidate is a frame having said third priority level (arrow OK from test S3), and eventually said candidate is defined as to be transmitted at least in part (i.e. at least a fragment of the candidate).

In an embodiment shown in FIG. 12, the Ethernet frames can be, before their transmissions, stacked in FIFO queues depending respectively on their priority levels, each queue corresponding thus to one priority level, and a head-of-queue frame having a priority level p and the closest next transmission time ($minNextTxTime_p$) among the frames having the same priority level p can be defined as the next candidate-for-transmission frame among all the frames of priority level p.

As for now the frames belonging to cyclic burst streams (named hereafter "CB frames"), for implementing b) with CB frames belonging to streams to be transmitted by successive Cyclic Bursts (each CB stream having its own predetermined period of burst transmission), the next transmission times of the CB frames can be computed on the basis of the predetermined period of burst transmission of the respective streams to which said CB frames pertain, so as to determine the aforesaid closest next transmission time.

Indeed, the cyclic burst streams are to be transmitted at predefined scheduled times and cannot bear any latency. Their frames have thus the highest priority level.

Therefore, the schedule of their transmission should follow a rigorous timing.

To that end, in an embodiment, a basis period of cycles of the network (CyclePer as shown on FIG. 7) is determined as the greatest common divisor among the burst transmission periods of the streams to which the CB frames pertain, and next transmission times of CB frames belonging to respective streams having respective different burst transmission periods are determined relatively to a time of start of one network cycle or of successive network cycles.

Moreover, the transmission of a burst of CB frames shall not suffer from any interference of transmission of other frames.

To that end, in an embodiment, at least one CB frame is selected as a candidate for a next CB frame transmission if a current time has not reached yet an estimated end of transmission of a burst to which said at least one CB frame belongs.

Therefore, in this embodiment, for a CB frame candidate, a time of end of transmission of said next CB frame is computed on the basis of a given length of said next CB frame and is compared to the estimated end of burst transmission for the burst to which said CB frame candidate belongs: the CB frame candidate is transmitted only if its time of end of transmission occurs before the estimated end of burst transmission.

The CB streams have the highest priority level. Even if a queue of a CB stream is empty, a time window corresponding to a transmission duration of a burst of that CB stream is reserved at each period cycle of that CB stream.

As indicated above, the CB frames have the highest priority level. Therefore, an intermediary (second) priority level (which is lower than the first priority level) can be assigned to Rate Controlled traffic frames (called RF frames hereafter).

In an embodiment, for RC frames belonging to express Rate Controlled streams and having said second priority level, before transmitting a RC frame, an end-of-transmission time of said RC frame is computed on the basis of a given length of said RC frame, and said RC frame is determined as to be transmitted only if said transmission end time occurs before a minimum among closest next times determined for any frame having a higher priority level than the RC frame.

The aforesaid end-of-transmission time of the RC frame is computed on the basis of the given length of the RC frame divided by a transmission rate of the network, defining thereby a duration of transmission of said RC frame until said end-of-transmission time.

In an embodiment, upon transmission of this RC frame, a next transmission time of a next RC frame of a same stream as the RC frame being transmitted is computed on the basis of the given length of the RC frame being transmitted. The determination of the aforesaid closest next time is then updated by taking into account the computed next transmission time. Here, in an embodiment, it can be chosen to compute the RC frame next transmission time on the basis of the given length of the RC frame being transmitted, divided by a transmission rate of a stream to which said RC frame belongs.

Typically, the frame length parameter (or directly the frame transmission duration) can be indicated in frame descriptor field of the frame. More generally, in an embodiment, at least one of:

a type of stream, a period of a cyclic burst stream, a frame length, is derivable from data indicated in each frame, said data defining a stream context.

Typically, for example the addresses of source and destination in fields of the frame make it possible to identify a stream and to assign an index to this stream. Thanks to an analysis of new coming frames, it is then possible to retrieve such addresses and to determine a related stream context (cyclic burst transmission, or rate controlled traffic, etc.). In a case where a cyclic timing of transmission of frames by successive bursts is observed, it is then also possible to determine a period of a cyclic burst stream.

The present invention aims also at a computer program comprising instructions which, when the program is executed by a processing circuit, cause the processing circuit to carry out the method as defined above. The invention aims also at a non-transitory computer storage medium, storing instructions of such a computer program.

FIGS. 6, 8, 9, 10, 11 are typically flowcharts that can illustrate a general algorithm of such a program.

The present invention aims also at an equipment comprising:

a processing circuit (PROC, MEM as presented in the example of FIG. 3 commented below), configured to implement the method as defined above, and a communication interface (COM, EGP) configured to be connected to the packet-switched network and to be piloted by the processing circuit in view to transmit Ethernet frames, when a transmission of said Ethernet frames is scheduled by the processing circuit.

More details and advantages of the invention will appear from the following specification of detailed possible and optional embodiments, and also from the appended drawings.

BRIEF DESCRIPTION OF DRAWINGS

FIG. 1 illustrates features of streams in industrial automation networks.

DESCRIPTION OF EMBODIMENTS

As presented in an embodiment below, the present invention makes it possible to concentrate in a single scheduling engine all the functionalities required to support different standards' traffic types, such as for example:

The different IEC/IEEE 60802 traffic types

The compatibility with TSN-standard QoS mechanisms implemented in the IA network bridges 802.1Q Cl. 8.6.8.4, Enhancement for Scheduled Traffic 802.1Q Cl. 37, Enhancement Transmission Selection The compatibility with frame pre-emption/fragmentation 802.1Q Cl. 6.7.2, 802.3 Cl.99.4

Optimal occupation of the transmission multiplex.

The proposed mechanism implements a frame transmission mechanism that shapes the traffics emitted by an industrial end-station complying with the IEC/IEEE 60802 standard (TSN profile for Industrial Automation networks). It relies on a single scheduler that sequences both Stream transmission opportunities and individual frame transmissions based on the combination of the base characteristics of the Streams.

A Stream's base characteristics can be typically:

its temporal behaviour parameters: shape type and rate or cycle period, and its priority to access the transmission resource.

Instead of manipulating traffic classes grouping Streams, as usually considered in IEEE 802 standards, the scheduler individually treats the Streams based on the above characteristics, derived from the application requirements, taking benefits of the fact that the number of Streams handled by an end-station is limited.

The proposed scheduler is a single Stream shaping capability able to generate traffic shapes according to the different IEEE 802.1 standards (Credit-Based Shaper, Enhancements for Scheduled Traffic, Enhanced Transmission Selection, Asynchronous Traffic Shaping) instead of having recourse to separate functions implementing each of those.

It is also capable of interworking with a frame preemption function possibly offered by the MAC layer of the end-station network interface.

Figure 2:
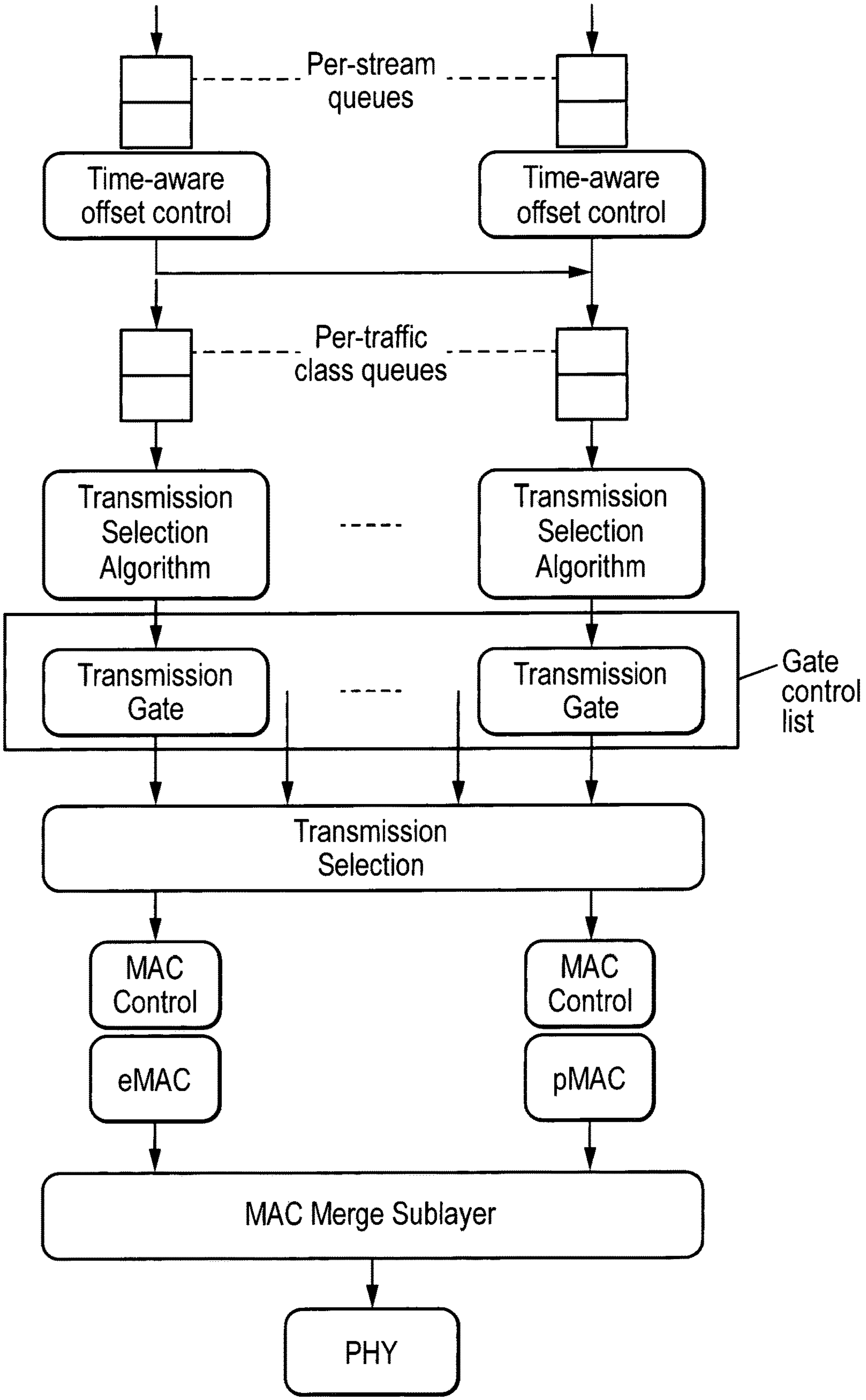
FIG. 2 illustrates the decoupling of middleware and applications, running in an end station while supporting different QoS requirements.
Figure 3:
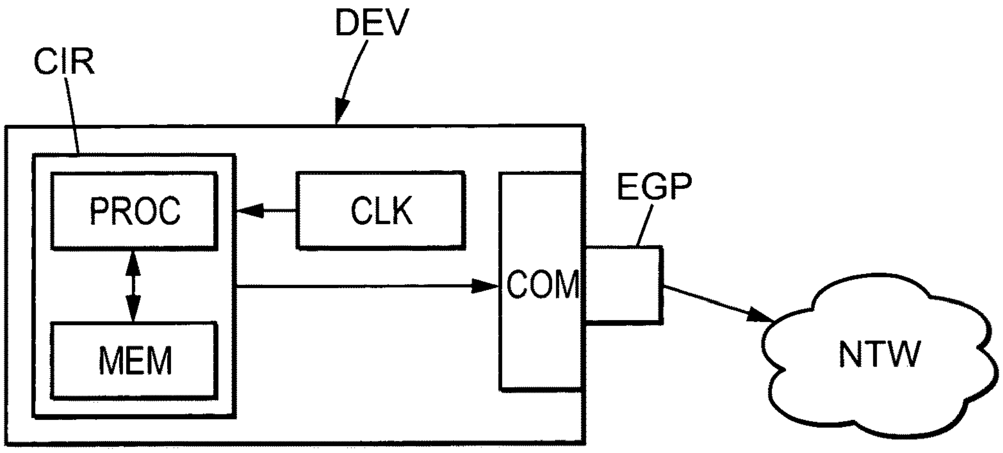
FIG. 3 shows an example of a device according to an embodiment of the present invention.

As shown on FIG. 3, an end station DEV can comprise a processing circuit CIR including a processor PROC and a memory MEM storing at least instructions data of a computer program according to the present invention. The processor PROC can access to the memory MEM so as to read and execute the instructions stored in the memory. Moreover, the end station DEV further includes at least a communication interface COM having an egress port EGP, and a clock CLK so as to enable the processor PROC to operate in synchronization with a clock of the network NTW to which the interface COM is connected. The clock CLK makes it possible to guarantee then to use a time synchronization protocol such as IEEE 802.1AS.

The end-station is moreover able to transmit streams belonging to the 8 (eight) Traffic Classes defined in IEEE 802.1Q, thanks to the egress port EGP and the configuration of the processing circuit CIR.

The end station is configured furthermore to support frame pre-emption as per IEEE 802.3 Cl. 99.4 and 802.1Q Cl.6.7.2. Moreover, the end station supports Enhanced Transmission Selection as per IEEE 802.1Q Cl. 37, as well as Stream identification as per IEEE 802.1CB and 802.1CBdb.

Frames belonging to the different streams transmitted by the end-station are queued on a per-stream basis, i.e. at least one queue is provided for each stream.

Hereafter, the wording "Stream shapes" defines the temporal behavior of the transmission of the frames of a Stream. The Stream shapes y are of different types as listed below:

Cyclic Burst (CB): the CB Stream frames are transmitted back-to-back, by groups. Each group of back-to-back frames is called a "burst". Bursts are transmitted cyclically according to a period defined for each Stream and cannot be longer than the maximum burst size defined for the Stream. Transmission opportunities are reserved for the CB Streams in every cycle whenever they are required to achieve their configured bitrate. CB Stream bursts experience minimal transmission jitter.

Rate-Controlled (RC): the RC Stream frames are transmitted one by one at a rate that cannot be faster than the maximum bitrate defined for the Stream. If a cyclic (asynchronous, i.e. its cycle is not directly synchronised to the network clock) communication is mapped onto an RC Stream, the latter can experience transmission jitter (in a minimal proportion when compared to the Stream cycle period)

Elastic Fair (EF): the EF Stream frames are transmitted one by one in a way that guarantees that all EF Streams get a fair share of the overall bandwidth that is allocated to them.

Eight Stream priority levels can be defined in order to keep consistency with the Traffic Class priority levels defined in IEEE 802.1Q and IEC/IEEE 60802.

The "Stream Rate" of a stream is defined using different parameters depending on the Stream shape.

In case of CB Streams, the Stream Rate is defined by the burst cycle and the maximum allowable burst size. These parameters can be translated into the maximum bitrate of the Stream.

In case of RC Streams, the Stream Rate is used to determined the minimum gap between the transmission of two successive frames based on their respective length. It is the theoretical maximum bitrate of the Stream, which can be exceeded after a period during which the Stream has remained idle or when reduced activity of the other Streams leaves more resource available.

For EF Streams, a way of defining the Stream Rate is to allocate a ratio of the overall bitrate allocated to all EF Streams. The bandwidth share allocated to each EF Stream is then weighted according to this ratio, and is actually allocated to them when they are all active. There are times when they can use more resource than their fair share, e.g. when some of the other EF Streams are idle.

The "synchronism" of a Stream indicates if the transmission times of its frames are synchronous to the network clock or to an arbitrary local or application clock.

The "Stream preemptability" indicates whether:

the Stream is preemptive (or Express), i.e. its frames are transmitted through the Express MAC (eMAC), or preemptible, i.e. its frames are transmitted through the Preemptible MAC (pMAC), and possibly fragmented before transmission so as to transmit one or few fragments only of a frame.

The Streams supporting the different traffic types defined in IEC/IEEE 60802 can be thus characterized by the combination of:

Shape,

Priority level,

Rate,

Synchronism,

Preemptability

The table below lists the combinations associated with each IEC/IEEE 60802 traffic type.

| Traffic type | Shape | Priority level | Rate | Synchronism | Preemptability |
|---|---|---|---|---|---|
| Isochronous | CB | 7 | Max burst size/cycle | Network | Preemptive |
| Cyclic-synchronous | CB | 6 | Max burst size/cycle | Network | Preemptive |
| Cyclic-asynchronous | RC | 5 | Max burst size/cycle | Application | Preemptive |
| Network control | RC | 4 | Committed rate | Network | Preemptive |
| Alarms and events | RC | 3 | Committed rate | Network | Preemptive |
| Configuration and diagnostics | RC | 2 | Committed rate | Application | Preemptable |
| Best effort | EF | 0; 1 | Weight (share of available bandwidth) | Application | Preemptable |

The frames of a given Stream are stored in FIFO order in per-Stream queues. The Stream and its queue are uniquely identified by an identifier obtained by applying one of the Stream identification functions defined in IEEE 802.1CB-2017 and IEEE 802.1CBdb-2021.

A flag indicating if the queue is empty is associated with each queue.

A Frame Descriptor is associated with each frame stored in the queue. This Frame Descriptor includes the following information:

Frame length (designated by a variable called hereafter "FrameLength"), expressed in bytes, Frame duration (designated by a variable called hereafter "FrameDur"), expressed in bit times. The bit-time is the duration of the transmission of one bit on the transmission link. The Frame duration represents the actual occupation of the transmission link required by the transmission of the frame and its associated MAC and physical layer overheads as they are defined for the used transmission media.

Figure 4:
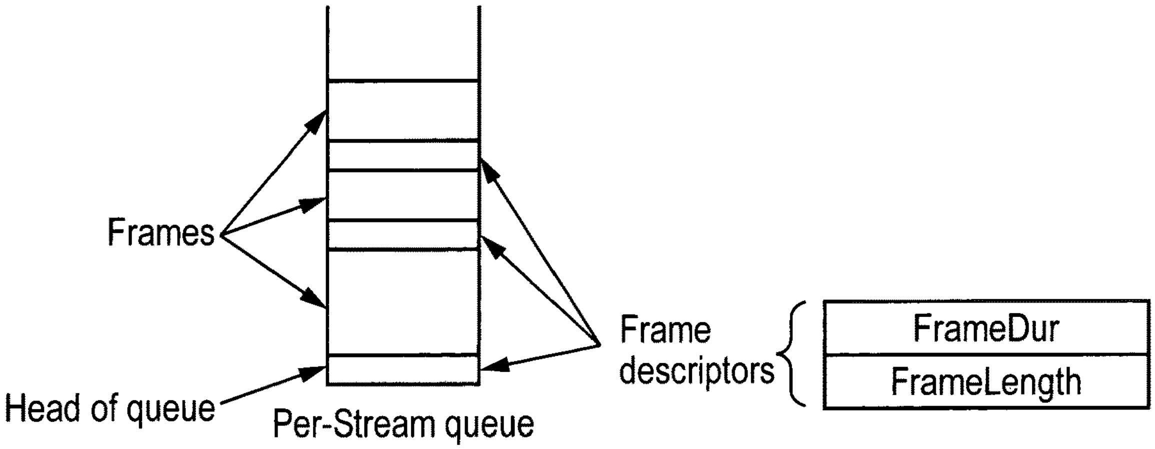
FIG. 4 shows different frames in a FIFO ("first in-first out") queue, and related descriptor fields.

These parameters are illustrated in FIG. 4. The second one can be derived from the first one thanks to the knowledge of the rate of transmission of the stream to which the frame pertains.

Figure 12:
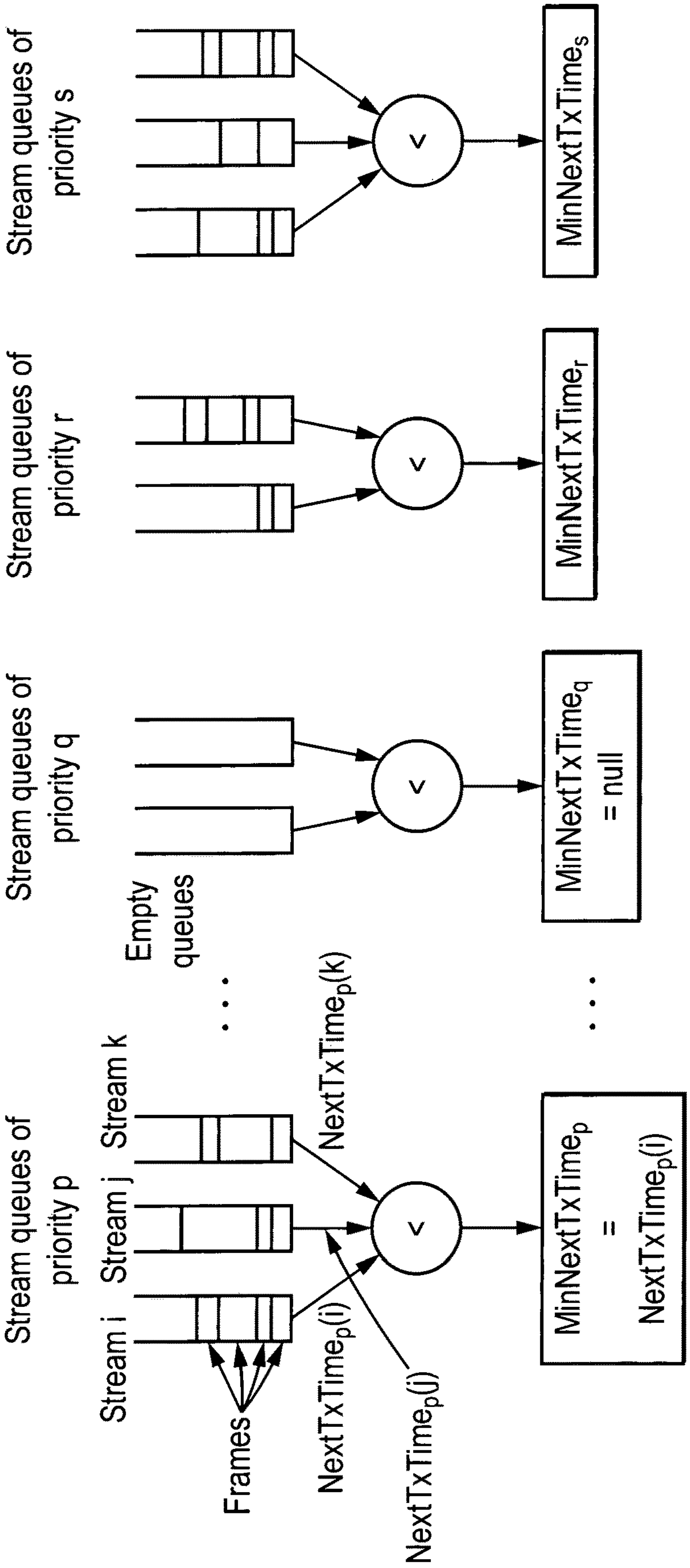
FIG. 12 illustrates per-stream queues grouped by priority level.

Per-Stream queues are grouped by priority level as shown in FIG. 12.

Here below, the "network cycle" is defined by a basis period (represented by a variable called "CyclePer" hereafter). This basis period can be 200 us for example if cyclic burst transmissions have to be scheduled respectively every 200 μs, 800 μs, and every 600 μs.

The variable "TCycle" designates hereafter, at any time, the start time of a current network cycle. It is the integral part of the division of a current time "T" by the variable CyclePer (the period of the basic network cycle as presented above).

When the rest of the division equals zero, the corresponding value of T marks then the beginning of a new network cycle.

A Stream context contains the following parameters:

Type: parameter indicating if the Stream is CB, RC or EF.

Rate: parameter that takes the following forms:

the period between two bursts, expressed in bit times, for a CB Stream the bitrate of the Stream, expressed for example in bits/second (for example Gb/s), for RC and EF Streams Offset: for a CB Stream only, parameter indicating the time position of the CB Stream burst relative to the beginning of the cycle BurstLength: For a CB Stream only, parameter indicating the maximum duration of the CB Stream burst NextTxTime: parameter indicating the next burst transmission time for a CB Stream or the next frame transmission time for an RC or EF Stream.

Figure 5:
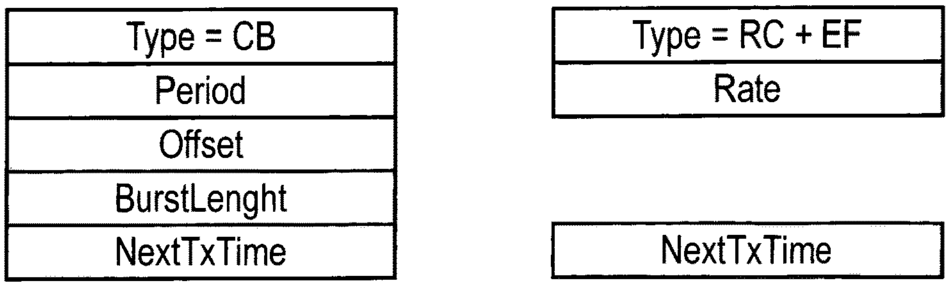
FIG. 5 shows parameters defining a steam context, for different types of frames.

These parameters are illustrated in FIG. 5.

Figure 6:
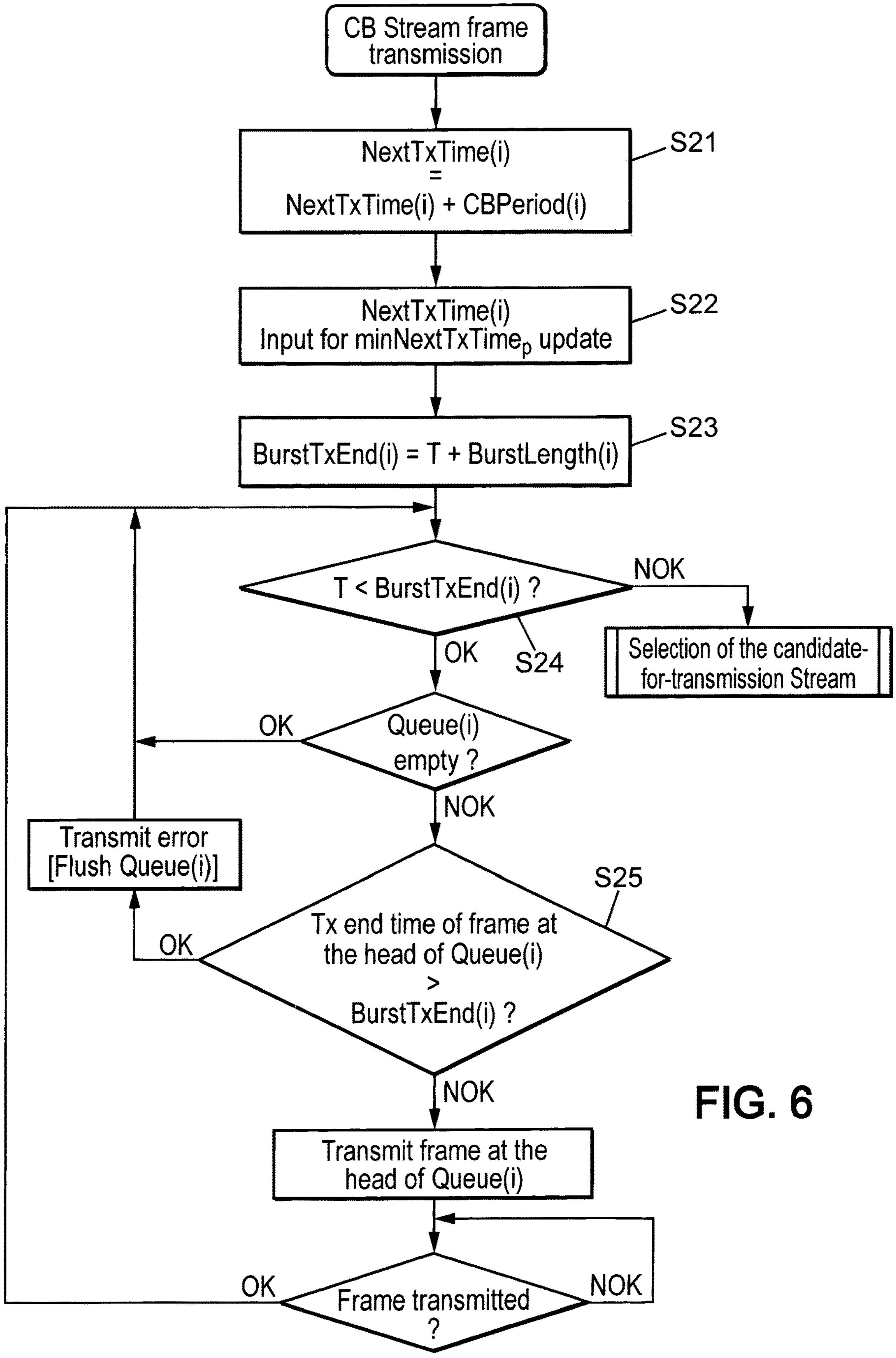
FIG. 6 is an example of flow chart of an algorithm for performing the transmission of CB Stream frames.
Figure 7:
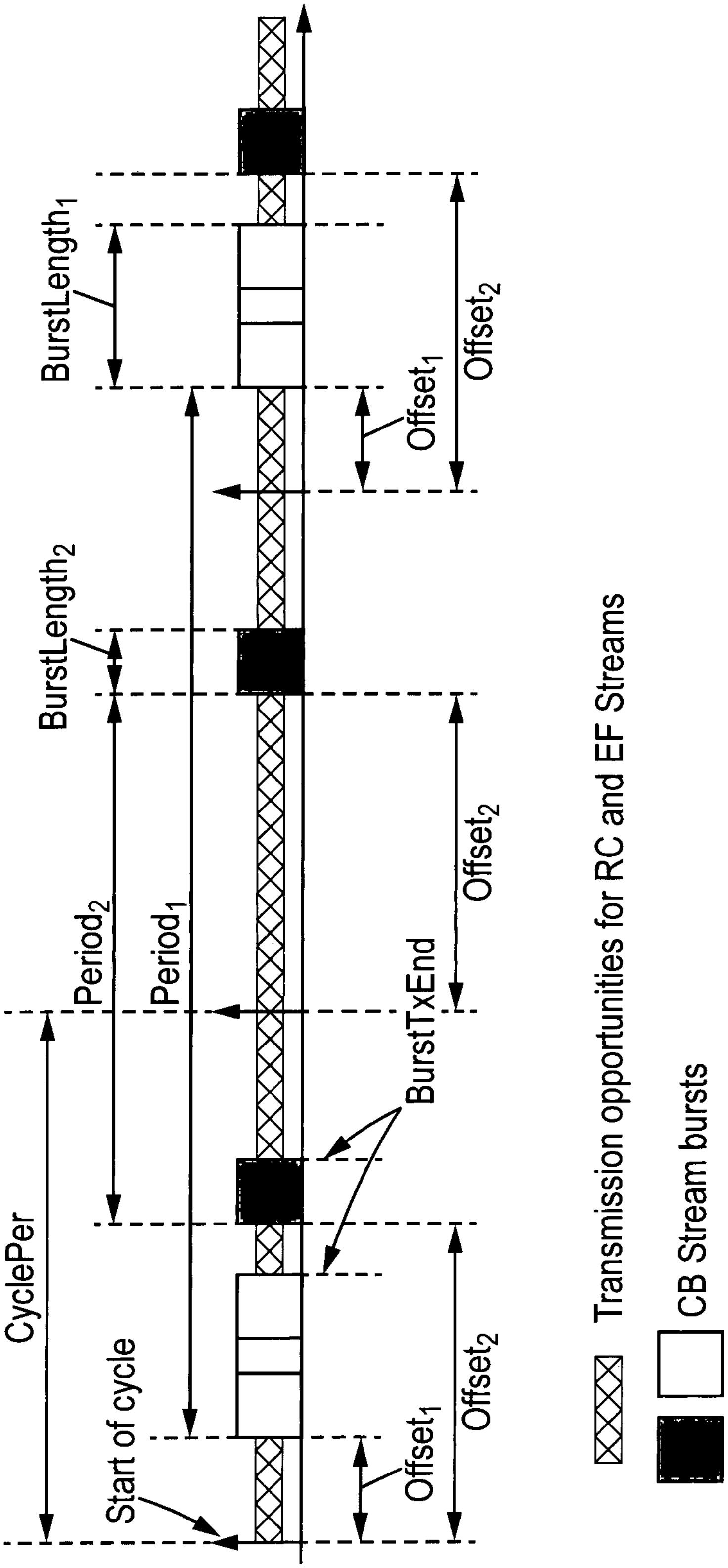
FIG. 7 illustrates an example of respective shapes of two subsequent CB Streams which do not have a same period of cyclic burst transmissions.

For CB Streams, NextTxTime is initialized with the value of TCycle+Period+Offset, with TCycle the value of T that marks the start of the current cycle, once the network interface has (re-)acquired the cycle synchronization. The parameter "Period" relates to CB frames (to be transmitted successively after a fixed time period as pertaining to a cyclic stream) as shown in FIGS. 5, 6 and 7 (where "Period, relates to a stream i).

NextTxTime is initialized with the value "0". Whenever the RC Stream queue status transits from empty to non-empty, NextTxTime is updated with the current value of T if T is strictly greater than NextTxTime. NextTxTime remains unchanged otherwise.

What is called hereafter "Stream configuration" consists in the operation of mapping the application communication requirements onto the parameters of given Streams (as presented below). CB Streams are assumed to be configured so that the transmission opportunities of the different bursts do not overlap.

Stream configuration results in Stream contexts' parameters. All of these parameters are not necessarily detailed hereafter in the present specification.

The mechanism for selecting the next Stream to have a frame transmitted operates as follows:

For each priority level p, the smallest NextTxTime (minNextTxTime$_p$) is determined by comparing the NextTxTime parameter stored in the contexts of the Streams of that priority having at least one frame in their transmit queue(i.e. if the queue associated with a Stream of priority p is empty, the NextTxTime parameter of that Stream is not used to determine minNextTxTime$_p$).

If all queues of all Streams of priority level p are empty, no Stream of that priority level is candidate for transmission, minNextTxTime$_p$ takes then the value "null".

It is to be noted that CB Streams are considered as having never empty queues and thus minNextTxTime$_p$ never takes the value "null" when p is a priority level associated with CB Streams.

An example of such queues is illustrated in FIG. 12.

The head-of-queue frame of the Stream associated with minNextTxTime$_p$ is the next candidate-for-transmission frame among all the Stream of priority p.

MinNextTxTime$_p$ is evaluated each time:

a frame of Stream i of priority level p is transmitted and Stream i's queue is not empty once the frame transmitted. In that case the updated value NextTxTime(i) is added to the set of NextTxTime values over which MinNextTxTime$_p$ is computed, or, a frame is added to an empty queue associated with a Stream of priority level p or, the burst end time of a CB Stream of priority level p is reached.

Upon initialization of the scheduling process, or when no frame is being transmitted, or at the end of a CB burst, the list of MinNextTxTime$_p$ values is scanned in order of decreasing priority level, e.g. starting from priority level 7 down to level 0 when 8 priority levels are defined.

In a step S1, if MinNextTxTime$_p$ equals "null" (a corresponding FIFO queue being empty typically), the process is re-started with the next lower priority level: p←p−1

In a step S2, if MinNextTxTime$_p$ value is different of "null", the Stream context associated with MinNextTxTime$_p$ is read.

In a step S3, if the Type parameter is set to CB or RC then next step S4 is implemented. Otherwise step S5 below is performed.

In a step S4, if T is smaller than MinNextTxTime$_p$, the series of tests above (steps S1 to S4) is re-iterated for the next lower priority level (p←p−1). Otherwise, operation continues at step S5 below.

In step S5, the transmission process of the Stream associated with MinNextTxTime$_p$ is initiated.

Figure 11:
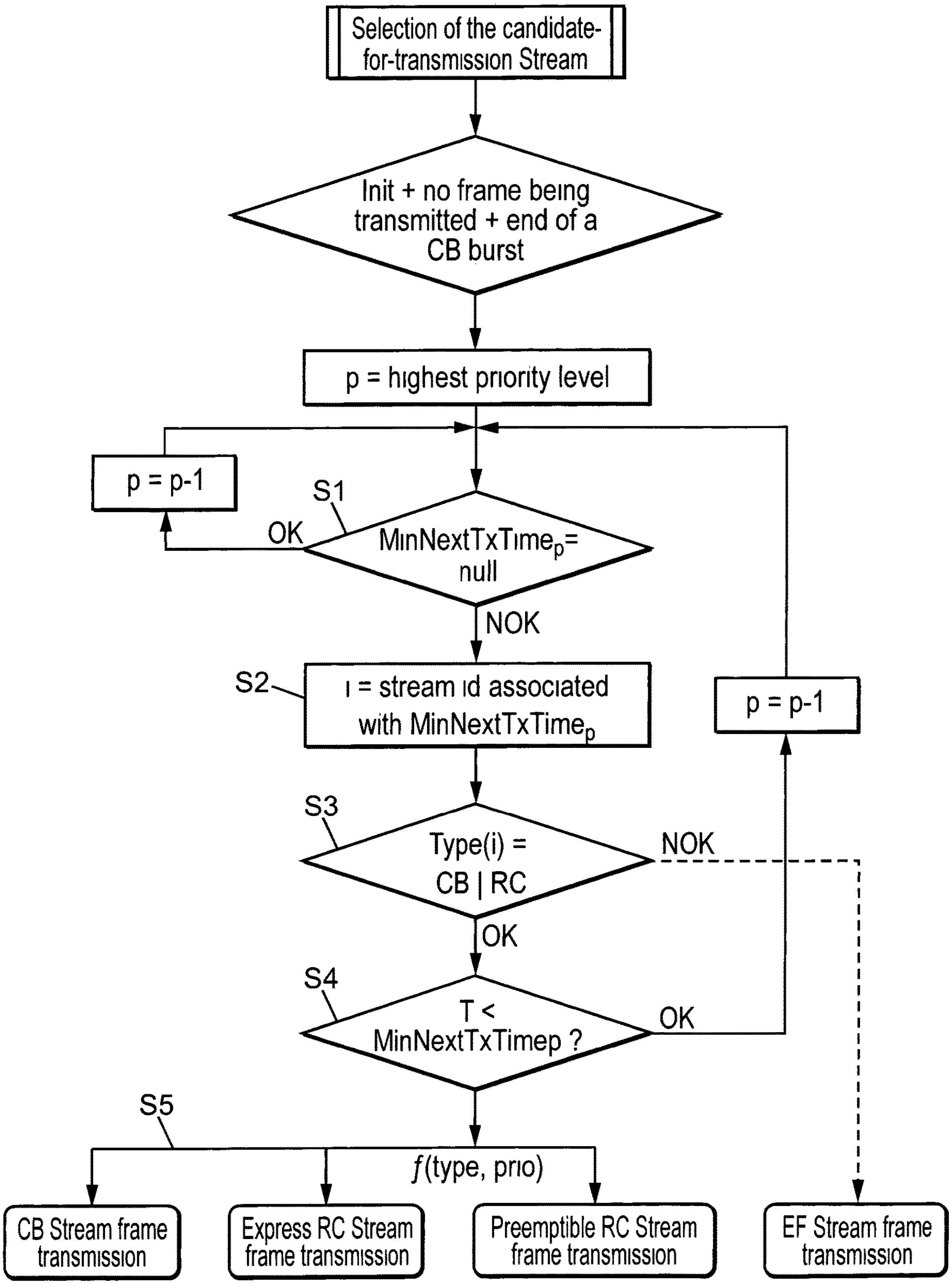
FIG. 11 is a flowchart of an example of algorithm to be implemented for scheduling frames' transmission having different types BC, RC and EF.

An example of embodiment for performing such an algorithm is illustrated in FIG. 11. In this example, if the next frame to be transmitted does not pertain to a CB stream or to an RC stream (arrow NOK from test S3), then the frame to transmit is an EF preemptible frame and can be transmitted according to a mechanism specific to that kind of preemptible traffic (namely by fragments when the egress port is idle).

Moreover, as long as the network time T has not reached yet MinNextTxTime$_p$ (tested in step S4), it is sought for a transmission of a possible frame having;

a lower priority level (decremented at p=p−1) and a next transmission time occurring before the MinNextTxTime$_p$ determined previously.

Otherwise, when T reaches MinNextTxTime$_p$, a CB or RC frame (or a fragment of RC frame when the RC stream to which it belongs is preemptible), for which the transmission time is the minimum next time for transmission (and is expired), is transmitted at step S5.

In the following, i denotes the identifier of the Stream selected for transmission, i.e. the Stream associated with, MinNextTxTime$_p$. The parameters stored in the Stream context attached to Stream i are identified using the notation of the index "i".

An example of algorithm to be implemented for the transmission of CB Stream frames can be represented by the flow chart shown on FIG. 6.

NextTxTime(i) is incremented by Period(i) (step S21) causing minNextTxTime$_p$ to be re-evaluated (step S22).

The burst end time, BurstTxEnd(i), is computed by adding BurstLength(i) to the current value of T (step S23).

If the queue associated with Stream i is not empty, the transmission end time of each frame is evaluated before its transmission (S25). The frame transmission end time is computed by adding its frame duration (FrameDur, given by the frame descriptor) to the current value of T. If the frame transmission end time is greater or equal BurstTxEnd(i), the frame is not transmitted and an error indication is generated (and the queue possibly flushed). If the frame transmission end time is smaller than BurstTxEnd(i), the frame is transmitted.

If the queue associated with Stream i is empty, no transmission occurs, even if frames of other types such as RC or EF frames, until BurstTxEnd(i) is reached. If a frame is enqueued in Stream i's queue before BurstTxEnd(i) is reached, it may be transmitted if its transmission end time is smaller than BurstTxEnd(i). Otherwise an error indication is generated and the queue is possibly flushed.

When BurstTxEnd(i) is reached (test S24), the selection of rather a next candidate-for-transmission Stream is carried out (for example another CB stream, or a frame or frame fragment of an RC or EF stream as presented below). In FIGS. 6, 8, 9, 10, the wording "Selection of the candidate-for-transmission Stream" generally relates then to a selection of a next stream frame to select as a candidate for transmission.

FIG. 7 illustrates an example of respective shapes of two subsequent CB Streams which do not have a same Period (Period1 being different from Period2). It is to be noticed on FIG. 7 that the CyclePer parameter can be interpreted in an embodiment as the greatest common divisor among Period1 and Period2.

Figure 8:
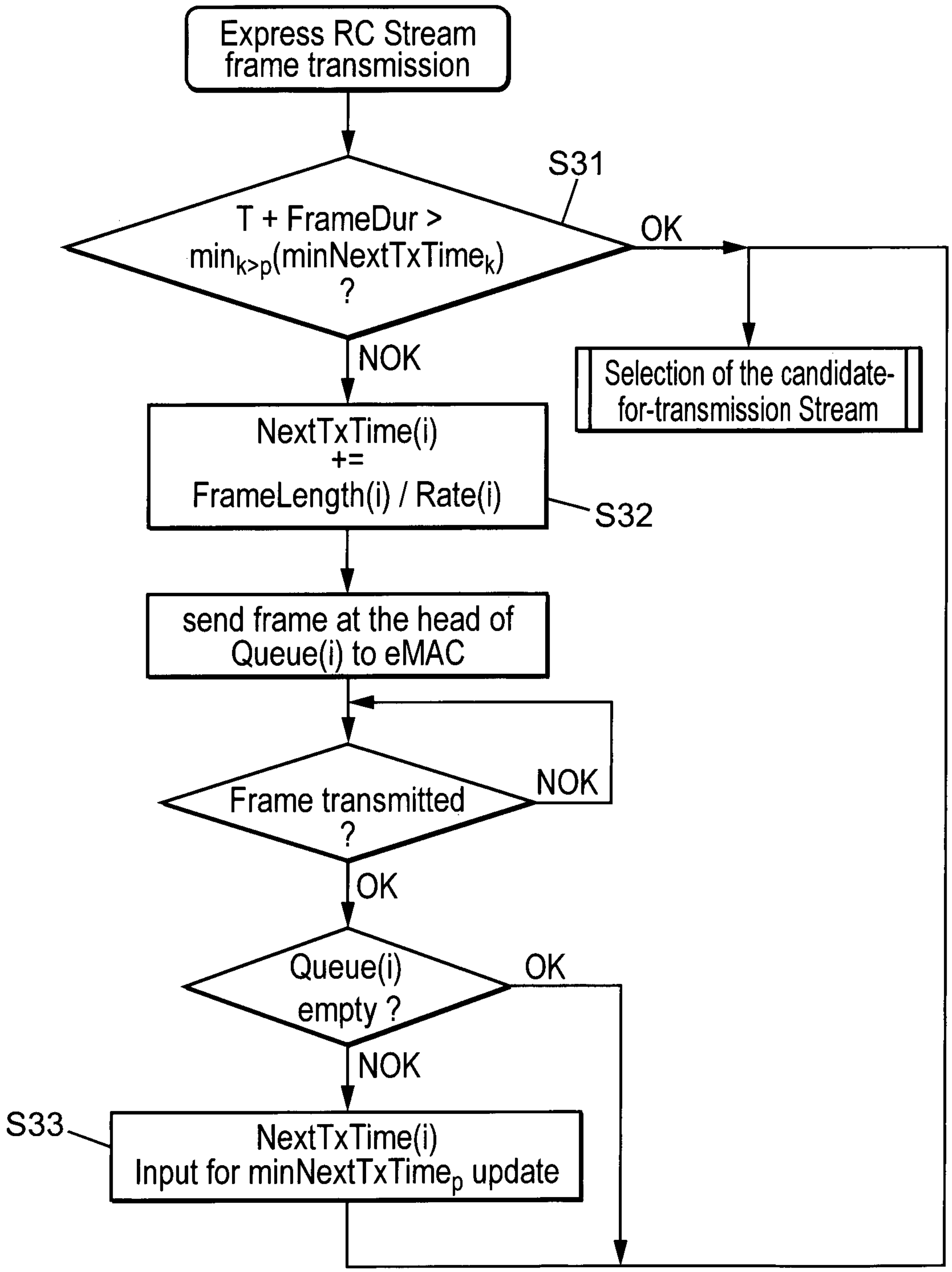
FIG. 8 is a flowchart of an example of algorithm to be implemented for the Express RC Stream frame transmission.

As for the Express RC Stream frame transmission now, an example of algorithm to be implemented can be represented by the flow chart shown on FIG. 8.

Express RC Streams have priority levels lower than CB Streams.

To avoid interference with the future transmission of a frame of higher priority level, before transmitting an Express RC frame, its transmission end time is computed by adding its frame duration FrameDur, indicated in the frame descriptor, to the current value of T. If the frame's transmission end time is greater than $\min_{k>p}(\text{minNextTxTime}_k)$ at step S31, the frame is not transmitted and $\text{minNextTxTime}_p$ is not updated.

Otherwise, the frame is transmitted through the Express MAC.

Upon the (completion of the) transmission of the frame, NextTxTime(i) is incremented by FrameLength/Rate(i) (expressed in bit times) in step S32. If Queue(i) is not empty, NextTxTime(i) is input to the computation of an update of $\text{minNextTxTime}_p$ (step S33) and the selection of a next candidate-for-transmission Stream is carried out.

Figure 9:
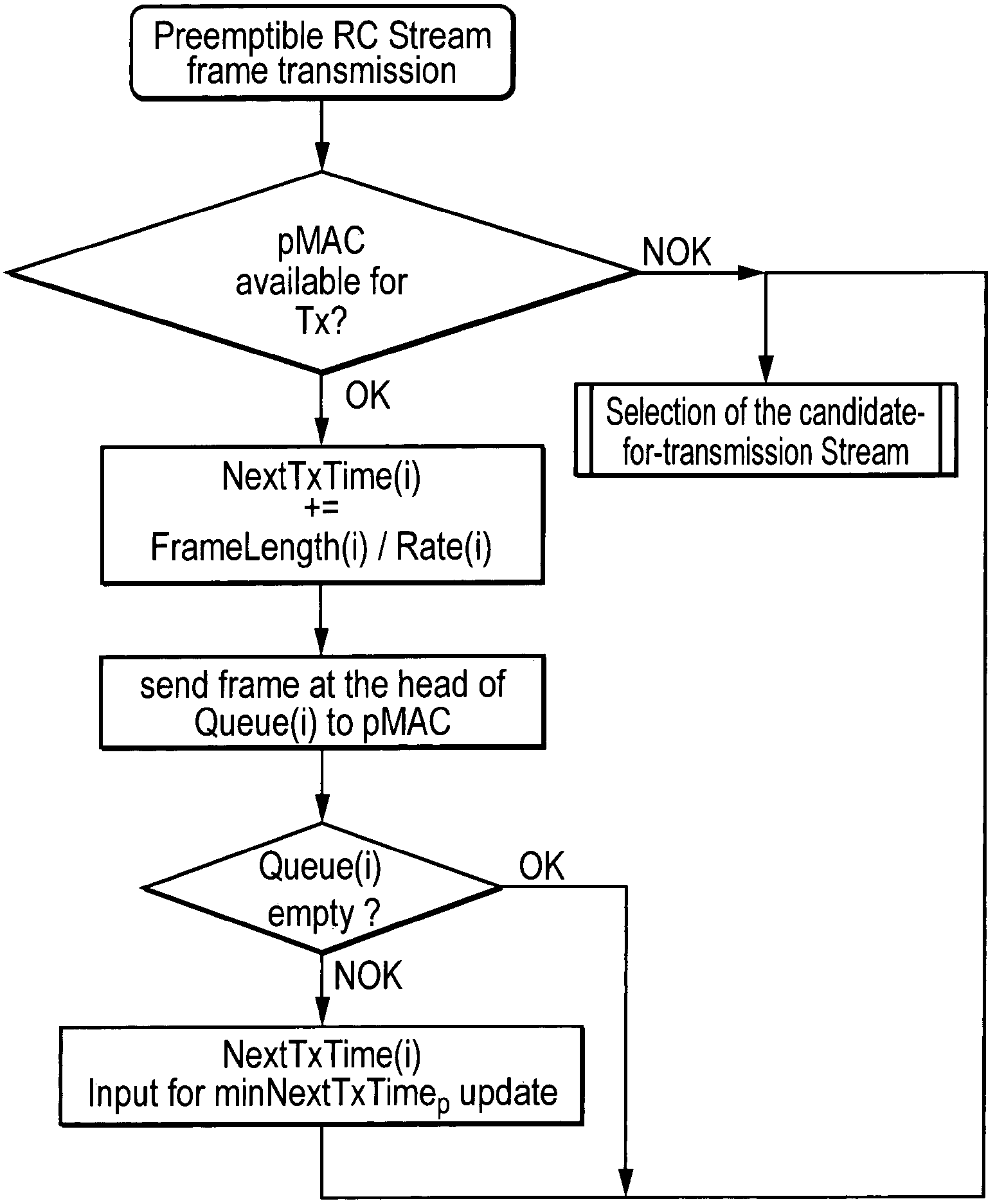
FIG. 9 is a flowchart of an example of algorithm to be implemented for the preemptible RC Stream frame transmission.

An example of algorithm to be implemented for the preemptible RC Stream frame transmission can be represented by the flow chart shown in FIG. 9.

Preemptible RC Streams have priority levels lower than Express RC Streams.

Preemptible RC Stream frame transmission operation is mostly similar to Express RC Stream frame transmission operation, except that an RC frame candidate for transmission is transmitted even though its transmission may interfere with the future transmission of a frame of a higher priority level. In that case, the interference is avoided by implementing frame pre-emption: namely, the frame can be cut into smaller fragments to be successively transmitted, until a minimum sized fragment, which is not detailed here because the implementation of the frame pre-emption mechanism itself is not in the scope of the present specification.

Here, if the Preemptible MAC (pMAC) is available for transmission, i.e. it is not holding a preemptible frame or frame fragment, the Preemptible RC Stream frame is transferred to the pMAC, and NextTxTime(i) is incremented by FrameLength/Rate(i) (expressed in bit times). Under the same condition, if Queue(i) is not empty, NextTxTime(i) is input to the computation of $\text{minNextTxTime}_p$ and the selection of a next candidate-for-transmission Stream is carried out.

If the Preemptible MAC is not available for transmission, i.e. it is holding a preemptible frame or frame fragment, the preemptible RC Stream frame is not transferred to the pMAC. In that case, NextTxTime(i) is not updated and $\text{minNextTxTime}_p$ is not re-evaluated.

Figure 10:
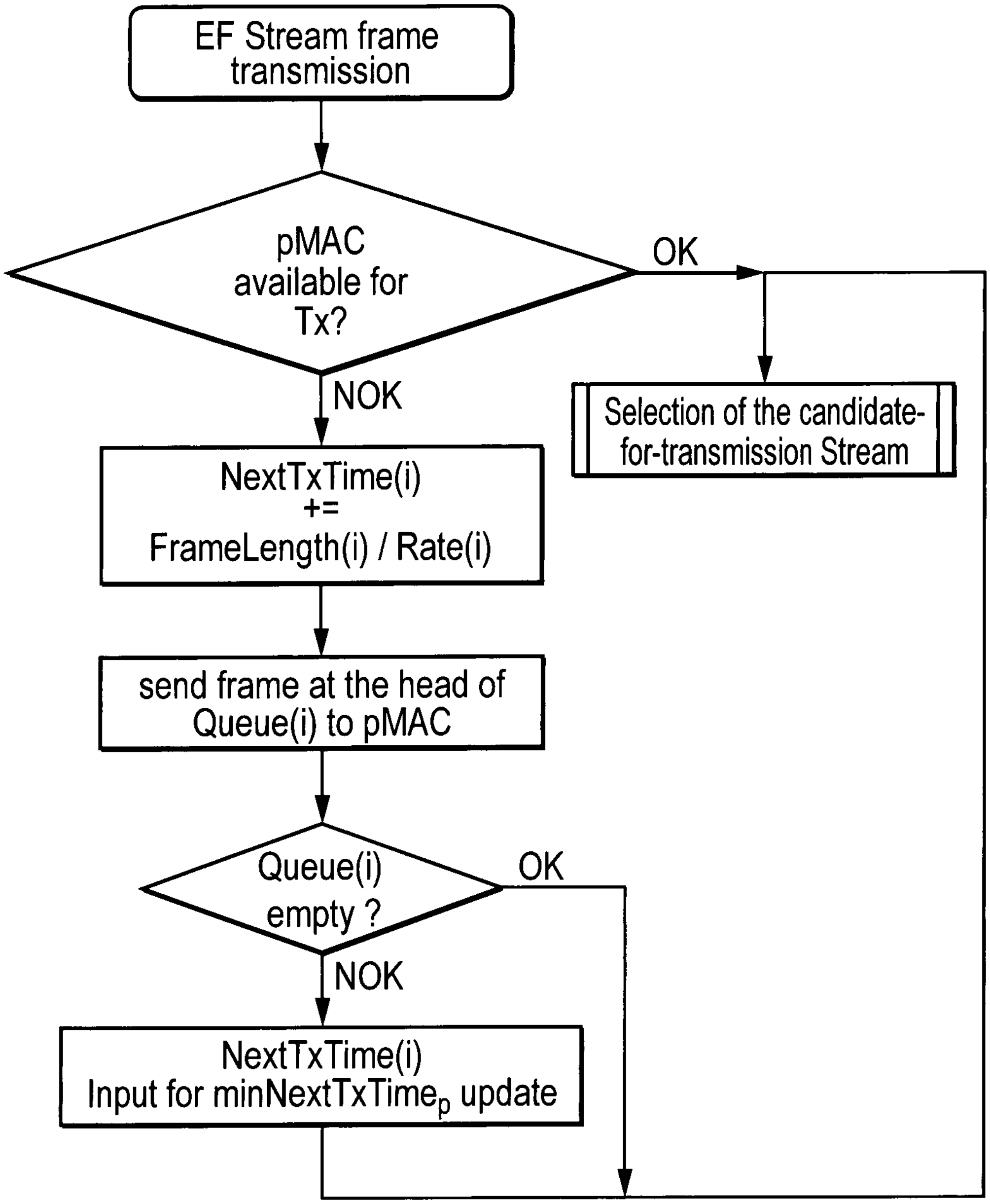
FIG. 10 is a flowchart of an example of algorithm to be implemented for the EF ("best effort") Stream frame transmission.

An example of algorithm to be implemented for the EF Stream frame transmission ("best effort") can be represented by the flow chart shown in FIG. 10.

EF Streams have a priority level lower than the one of the Preemptible RC Streams.

The selection of the EF Stream frame to be transmitted is solely based on the Stream identifier associated with $\text{minNextTxTime}_p$ as described below.

EF Stream frame transmission operation is identical to Preemptible RC Stream frame transmission operation.

If the Preemptible MAC (pMAC) is available for transmission, i.e. it is not holding a preemptible frame or frame fragment, the EF Stream frame is transferred to the pMAC, and NextTxTime(i) is incremented by FrameLength/Rate(i). Under the same condition, if Queue(i) is not empty, NextTxTime(i) is input to the computation of $\text{minNextTxTime}_p$ and the selection of a next candidate-for-transmission Stream is carried out.

If the Preemptible MAC is not available for transmission, i.e. it is holding a preemptible frame or frame fragment, the EF Stream frame is not transferred to the pMAC. In that case, NextTxTime(i) is not updated and $\text{minNextTxTime}_p$ is not re-evaluated and the selection of a next candidate-for-transmission Stream is carried out.

An implementation of the invention can be targeted at packet-switched networks supporting a mix time-critical and non-time-critical traffics as they can be encountered in industrial automation networks.

It simplifies the design of Ethernet TSN network interfaces in industrial automation end-station devices.

The invention claimed is:

1. A method implemented in a packet-switched network for scheduling transmission of Ethernet frames, the method comprising:

a) determining a priority level of each Ethernet frame to transmit, based on identification of data given in said Ethernet frame and related to a stream to which said Ethernet frame belongs, said data distinguishing thereby:
  - frames belonging to streams to be transmitted by successive cyclic bursts, and having a first priority level, a plurality of the frames corresponding to a stream in one of the successive cyclic bursts,
  - frames belonging to rate controlled streams, and having a second priority level, lower than said first priority level, and
  - frames belonging to non-time critical traffic streams, having a third priority level, lower than said first and second priority levels, b) determining, among the frames having the highest priority level, a frame, candidate for transmission, having a closest next time from a current time, at which said candidate frame is to be transmitted, and c) estimating an end-of-transmission time of the frame of said candidate, and checking whether another future frame having a higher priority level than the candidate does not have a next transmission time occurring before the end-of-transmission time of the candidate, and eventually transmitting the candidate.

2. The method of claim 1, wherein, after b), if said closest next transmission time is after said current time given by a common clock of the packet-switched network, b) is repeated with a priority level resulting from a decrement of said highest priority level and as long as the closest next transmission time determined in b) is after said current time.

3. The method of claim 2, wherein said frames belonging to non-time-critical traffic streams, and having thus said third priority level, are identified as belonging to a preemptable traffic and transmittable whenever no frames of first and second priority levels are to be transmitted, And wherein, before testing whether said closest next transmission time is after said current time, it is determined whether said candidate is a frame having said third priority level, and eventually said candidate is defined as to be transmitted at least in part.

4. The method according to claim 1, wherein the Ethernet frames are, before their transmissions, stacked in FIFO queues depending respectively on their priority levels, the frames stacked in a same queue having one same priority level, and a head-of-queue frame having a priority level p and the closest next transmission time among the frames having the same priority level p is the next candidate-for-transmission frame among all the frames of priority level p.

5. The method according to claim 1, wherein, for implementing b) with CB frames belonging to streams to be transmitted by successive Cyclic Bursts, each stream having a predetermined period of burst transmission, next transmission times of said CB frames are computed on the basis of the predetermined period of burst transmission of the respective streams to which said CB frames pertain, so as to determine said closest next transmission time.

6. The method according to claim 5, wherein a basis period of cycles of the network is determined as a greatest common divisor among the burst transmission periods of the streams to which said CB frames pertain, and wherein next transmission times of CB frames belonging to respective streams having respective different burst transmission periods are determined relatively to a time of start of one network cycle or of successive network cycles.

7. The method according to claim 5, wherein at least one CB frame is selected as a candidate for a next CB frame transmission if a current time has not reached yet an estimated end of transmission of a burst to which said at least one CB frame belongs.

8. The method according to claim 7, wherein, for a CB frame candidate, a time of end of transmission of said next CB frame is computed on the basis of a given length of said next CB frame and is compared to the estimated end of burst transmission for the burst to which said CB frame candidate belongs, and said CB frame candidate is transmitted only if its time of end of transmission occurs before said estimated end of burst transmission.

9. The method according to claim 1, wherein, for RC frames belonging to express Rate Controlled streams and having said second priority level, before transmitting a RC frame, an end-of-transmission time of said RC frame is computed on the basis of a given length of said RC frame, and said RC frame is determined as to be transmitted only if said transmission end time occurs before a minimum among closest next times determined for any frame having a higher priority level than the RC frame.

10. The method according to claim 9, wherein said end-of-transmission time is computed on the basis of the given length of the RC frame divided by a transmission rate of the network, defining thereby a duration of transmission of said RC frame until said end-of-transmission time.

11. The method according to claim 9, wherein upon transmission of said RC frame, a next transmission time of a next RC frame of a same stream as the RC frame being transmitted is computed on the basis of said given length of the RC frame being transmitted, the determination of said closest next time being updated by taking into account said computed next transmission time.

12. The method according to claim 1, wherein at least one of:

a type of stream, a period of a cyclic burst stream, a frame length, is derivable from data indicated in each frame, said data defining a stream context.

13. A computer program comprising instructions which, when the program is executed by a processing circuit, cause the processing circuit to carry out the method of claim 1.

14. An equipment comprising:

a processing circuit configured to implement the method according to claim 1, and a communication interface configured to be connected to the packet-switched network and to be piloted by the processing circuit in view to transmit Ethernet frames, when a transmission of said Ethernet frames is scheduled by the processing circuit.

* * * * *